United States Patent [19]

Jones

[11] 4,237,087

[45] Dec. 2, 1980

[54] METHOD OF EMBOSSING WOOD COMPOSITION BOARD

[75] Inventor: Donald B. Jones, Leola, Pa.

[73] Assignee: Armstrong Cork Company, Lancaster, Pa.

[21] Appl. No.: 82,013

[22] Filed: Oct. 5, 1979

[51] Int. Cl.[3] ........ B32B 3/26

[52] U.S. Cl. ........ 264/134; 264/119

[58] Field of Search ........ 264/134, 119

[56] References Cited

U.S. PATENT DOCUMENTS

| | | | |
|---|---|---|---|
| 4,007,076 | 2/1977 | Clarke et al. | 264/119 |
| 4,073,672 | 2/1978 | Clarke et al. | 264/119 |
| 4,175,105 | 11/1979 | Luck et al. | 264/134 |

*Primary Examiner*—Donald E. Czaja

*Assistant Examiner*—James R. Hall

*Attorney, Agent, or Firm*—Dennis M. Kozak

[57] ABSTRACT

A method of embossing wood composition board is disclosed. This method employs a water-borne base-coat composition which facilitates fine line embossing of the filled surface of wood composition board in imitation of fine grain woods, such as, for example, pecan and prima vera.

3 Claims, No Drawings

METHOD OF EMBOSSING WOOD COMPOSITION BOARD

This invention relates to a method of embossing wood composition board.

More specifically, this invention relates to the use of a water-borne basecoat compostion which facilitates the embossing of wood composition board.

In one of its more specific aspects, this invention pertains to the use of a water-borne basecoat composition which facilitates fine line embossing of the filled surface of wood composition board in imitation of fine grain woods, such as, for example, pecan and prima vera.

Embossing wood composition board (fiberboard or particleboard) is well known. Typically, wood composition board is embossed by placing the board on a flat bed press equipped with an embossing plate having a mirror image of the pattern to be embossed and pressed at a temperature up to 500° F. and under high pressure for 2 to 10 seconds. The resulting embossed board is then conventionally finished by sequentially applying a conventional organic solvent type basecoat, toning, glazing, and lacquering. If desired, the board can be printed after it is base-coated.

It is also well known in the art that the above described method does not facilitate fine line embossing in imitation of fine grain wood. Fine line embossing as used herein refers to embossing plate lines which are from 1 to about 10 mils both in width and height above the valleys of the embossing plate. The reason that the above method is not suitable to produce imitation fine line wood grain is that the fine line detail is lost or obscured as a result of the conventional finishing steps.

Accordingly, in order to achieve some degree of imitation fine line wood grain detail when embossing wood composition board, the board is typically prefinished; that is, the application of the basecoat and the printing preceed embossing. However, prefinishing the board with the conventional thermoplastic or thermosetting organic solvent type basecoat creates another problem. At press temperatures high enough, typically 300°-350° F., to get good embossing at reasonable pressures the basecoat softens and when the press is disengaged pieces of the basecoat, having the wood grain pattern print superimposed thereon, separate (pick-off) from the board and stick to the embossing plate, leaving a surface on the board which is unsuitable for finishing. For example, if the board is embossed at 350° F. and a pressure of 1,500 psi for 5 seconds, the conventional organic solvent type basecoat will separate from the board and stick to the embossing plate.

One method used in the art to eliminate the basecoat from separating and sticking to the embossing plate is to position a thin film (0.5 to 1.5 mils thick) of material such as Mylar, which is not affected by the high process temperatures, between the embossing plate and the base-coated, printed board. The use of the film eliminates pick-off of the print basecoat. And, the use of a film, depending on its thickness will facilitate the embossing of at least some fine line wood grain detail. However, the use of the film also requires an extra handling operation and once used, the Mylar film is not reusable. Accordingly, from a production viewpoint, the use of a Mylar film is not satisfactory since its use requires both additional manpower and an additional raw material. also, as might be expected, having to emboss through even a 0.5 mil thick Mylar film results in the loss of some fine line detail.

The subject invention helps to solve the above problems by providing a method for embossing wood composition board which does require the use of a film. In its preferred embodiment, this invention provides a method for fine line embossing wood composition board in imitation of fine grain wood which method provides improved fine line detail and does not require the use of a Mylar film.

According to this invention there is provided a method for embossing a pattern on the filled surface of particleboard or fiberboard comprising: (a) applying a water-borne basecoat composition comprising an acrylic emulsion resin, a urea resin, and an acid catalyst to the filled surface of particleboard or fiberboard, (b) curing the water-borne basecoat composition, (c) forming a mirror image of the pattern to be embossed on a metal embossing plate, and; (d) embossing the base-coated particleboard or fiberboard with said metal embossing plate at a press temperature equal to or above 350° F. and a pressure equal to or above 1500 psi whereby, when the embossing plate is removed, the cured water-borne base-coat does not separate from the particleboard or fiber-board.

Also, according to this invention there is provided a method for fine line embossing a fine grain wood pattern on the filled surface of particleboard or fiberboard comprising: (a) applying a water-borne base-coat composition comprising an acrylic emulsion resin, a urea resin, and an acid catalyst to said filled surface, (b) curing the water-borne basecoat composition, (c) printing the base-coated particleboard or fiberboard with a fine grain wood print, the grain being from about 1 to about 10 mils in width, (d) forming a mirror image of a fine grain wood panel on a metal embossing plate, the fine grain being from about 1 to about 10 mils in width and from about 1 to about 10 mils in depth, to provide an embossing plate having embossing grain lines of from about 1 to about 10 mils in width and extending from about 1 to 10 mils in height above the valleys of the embossing plate, and; (e) embossing the printed, base-coated particleboard or fiberboard with said metal embosing plate at a press temperature equal to or above 350° F. and a pressure equal to or above 1500 psi whereby when the embossing plate is removed, the cured water-borne basecoat does not separate from the particleboard or fiberboard.

As used herein, the term "urea resin" is understood to mean both urea-formaldehyde and melamine-formaldehyde resins.

In one embodiment the water-borne basecoat composition will comprise at least one filler, at least one hiding pigment, and at least one dispersing agent. Optionally, the composition can comprise a defoaming agent.

In another embodiment, the fine grain wood print and the metal embossing plate are produced using the identical fine grain wood panel and the embossing is done in register with the printed base-coated particleboard or fiberboard. Having described the method of this invention, reference is now made to the following examples which set forth the best mode for practicing the invention.

EXAMPLE I

This example demonstrates the preparation of 100 gallons of a water-borne basecoat composition suitable for use in this invention. The following ingredients were employed:

| Ingredients | Amounts (pounds/100 gallons) |
|---|---|
| acrylic emulsion resin (50% solids) ("Rhoplex AC-1024" - Rohm & Hass) | 192.8 |
| methylated urea - formaldehyde resin ("Beetle-65" - American Cyanamid) | 94.4 |
| acid catalyst - 25% by weight paratoluene sulfonic acid 75% by weight isopropyl alcohol | 40.0 |
| dispersing agents: | |
| (1) sodium salt of polymeric carboxylic acid, anionic, 25% solids ("Tamol 731" - Rohm & Hass) | 10.0 |
| (2) acetylenic glycol blend in ethylene glycol, nonionic, 83% solids ("Surfynol TG" - Air Products & Chemicals) | 2.0 |
| defoamer - 100% active yellow-amber liquid designated: ("Nopco NXZ" - Diamond Shamrock) | 1.0 |
| hiding pigments: | |
| (1) titanium dioxide pigment ("Tipure R-900" - E.I. DuPont) | 260.0 |
| (2) iron oxide pigment ("Mapico Tan 10" - Columbian Carbon Co.) | 7.0 |
| (3) iron oxide pigment ("Mapico Yellow 1150" - Columbian Carbon Co.) | 25.0 |
| fillers: | |
| (1) barium sulfate (paint grade) | 100.0 |
| (2) amorphous silica ("Imsil A-15" - Illinois Minerals) | 80.0 |
| water | 375.0 |

Into a mix tank containing 150 pounds of the water were added the total amounts of both dispersing agents and the defoamer with stirring at room temperature.

The total amounts of the three hiding pigments were added to the mix tank with stirring until the pigments were uniformly dispersed.

The total amounts of both fillers were added to the mix tank and uniformly dispersed with stirring. p The contents of the mix tank were stirred for about 15 to 20 minutes and a paste of uniform consistency was obtained.

Next, the total amounts of the acrylic emulsion resin, the methylated urea-formaldehyde resin, the acid catalyst and the remaining amount of water were sequentially added to the paste in the mix tank with stirring and stirring was continued for about 10 minutes.

The resulting water-borne basecoat composition was tested and found to contain 56% solids by weight, weigh 11.9 pounds per gallon, have a pH of 3 and a #2 Zahn cup viscosity of 30 seconds.

EXAMPLE II

This example demonstrates the fine line embossing method of this invention using the water-borne basecoat composition of Example I.

An 8" by 8" sample of particleboard having a density of about 50 lbs. per cubic foot was reverse roll coated with a conventional UV curable polyester filler and the filler coating was UV cured.

After sanding to provide a smooth surface, the filled particleboard was spray coated with the water-borne basecoat composition of Example I, to a coating thickness of from about 1½ to 2 mils, using an air atomized spray nozzle.

The resulting base-coated, particleboard was placed in a circulation air oven set at 250° F. for a period of ten minutes to cure the basecoat composition.

The resulting particleboard was cooled and conventionally rotogravure printed with a prima vera wood grain pattern, the grain being from about 1 to about 10 mils in width.

The printed, particleboard was placed in a press equipped with a prima vera wood grain fine line embossing plate having embossing lines of 1 to 10 mils in width and extending 1 to 10 mils in height above the valleys of the embossing plate. The embossing plate can be made by any conventional process. This particular plate was made by making a silicone rubber casting of a prima vera wood panel followed by electroforming deposits of nickel onto the silicone casting to produce a mirror image of the fine grain in the prima vera wood panel. The embossing plate was preheated to a temperature of 375° F. (typically, the plate is preheated to a temperature within the range of from about 300° to about 500° F.), and the particleboard was embossed at a press temperature of 425° F. for a period of 8 seconds at a pressure of 1,500 psi.

The press was disengaged and the embossed particleboard readily fell apart from the embossing plate with no sticking or pick-off of the basecoat. Fine line wood grain embossing detail was observed to be excellent.

Using the same fine line embossing plate and press conditions, a second 8" by 8" sample of the same sanded polyester filled, base-coated particleboard was embossed, this time with a 0.5 mil Mylar film placed between the particleboard and the embossing plate.

The board produced using the method of Example II and the board produced using the 0.5 mil Mylar sheet were observed and compared. The comparison showed that the board produced using the Mylar film exhibited less fine line detail than the board produced according to this invention, that is, without a Mylar film. The use of the Mylar film prevented the total transfer of the fine line detail from the fine line embossing plate to the particleboard.

Accordingly, the above comparison serves to illustrate that the fine line embossing method of this invention provides for enhanced fine line imitation wood grain pattern detail in wood composition board as compared to the prior art method involving the use of a Mylar sheet.

It will be evident from the foregoing that various modifications can be made to the present invention. Such, however, are considered as being within the scope of this invention.

What is claimed is:

1. A method for embossing filled particle-board or fiberboard comprising:

(a) applying a water-borne basecoat composition comprising an acrylic emulsion resin, a urea resin, and an acid catalyst to the filled surface of said particleboard or fiberboard;

(b) curing the water-borne basecoat composition;

(c) forming a mirror image of a pattern to be embossed on a metal embossing plate; and (d) embossing the base-coated particle-board or fiberboard with said metal embossing plate at a press temperature equal to or above 350° F. and a pressure equal to or above 1,500 psi whereby, when the embossing plate is removed, the cured water-borne base-coat does not separate from the particleboard or fiber-board.

2. A method for fine line embossing a fine grain wood pattern on the filled surface of particle-board or fiber-board comprising:

(a) applying a water-borne basecoat composition comprising an acrylic emulsion resin, a urea resin, and an acid catalyst to said filled surface;

(b) curing the water-borne basecoat composition;

(c) printing the base-coated particle-board or fiber-board with a fine grain wood print, the grain being from about 1 to 10 mils in width;

(d) forming a mirror image of a fine grain wood panel on a metal embossing plate, the fine grain in the wood panel being from about b 1 to about 10 mils in width and from about 1 to about 10 mils in depth, to provide an embossing plate having embossing grain lines of from about 1 to about 10 mils in width and extending from about 1 to 10 mils in height above the valleys of the embossing plate; and, (e) embossing the printed, base-coated particleboard or fiberboard with said metal embossing plate at a press temperature equal to or above 350° F. and a pressure equal to or above 1,500 psi whereby, when the embossing plate is removed, the cured water-borne basecoat does not separate from the particle-board or fiberboard.

3. The method of claim 2 in which the fine grain wood print in step (c) and the metal embossing plate in step (d) are produced using the identical fine grain wood panel and embossing step (e) is done in register with the printed, base-coated particleboard or fiber-board.

* * * * *